US012809787B2

(12) United States Patent
Pelton et al.

(10) Patent No.: US 12,809,787 B2
(45) **Date of Patent: *Nov. 24, 2026**

(54) PROTECTION OF DATA IN MEMORY OF AN INTEGRATED CIRCUIT USING A SECRET TOKEN

(71) Applicant: Microsoft Technology Licensing, LLC, Redmond, WA (US)

(72) Inventors: Blake D. Pelton, Redmond, WA (US); Haohai Yu, Redmond, WA (US); Chirag Varde, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 30 days.

This patent is subject to a terminal disclaimer.

(21) Appl. No.: 18/768,752

(22) Filed: Jul. 10, 2024

(65) Prior Publication Data

US 2024/0362170 A1 Oct. 31, 2024

Related U.S. Application Data

(63) Continuation of application No. 17/870,144, filed on Jul. 21, 2022, now Pat. No. 12,061,558, which is a (Continued)

(51) Int. Cl.
*G06F 21/00* (2013.01)
*G06F 9/46* (2006.01)
(Continued)

(52) U.S. Cl.
CPC .......... *G06F 12/1408* (2013.01); *G06F 9/468* (2013.01); *G06F 12/0246* (2013.01); *G06F 12/0835* (2013.01)

(58) Field of Classification Search
CPC .. G06F 12/1408; G06F 9/468; G06F 12/0246; G06F 12/0835
See application file for complete search history.

(56) References Cited

U.S. PATENT DOCUMENTS 7,522,083 B2 * 4/2009 Sahara ................ H03M 1/1061 341/154
8,452,934 B2 * 5/2013 Jogand-Coulomb ........................ G06F 13/4243 711/163
(Continued)

FOREIGN PATENT DOCUMENTS

CN 103730169 A * 4/2014 ............. G01D 9/005
DE 10142351 A1 * 3/2003 ........... G07F 7/1008
(Continued)

OTHER PUBLICATIONS

Office Action Received for European Application No. 20764557.3, mailed on Aug. 13, 2024, 5 pages.
(Continued)

*Primary Examiner* — Ghodrat Jamshidi

(57) ABSTRACT

Methods, systems, apparatuses, and computer program products are provided for protecting data in a memory of an integrated circuit (IC). A process token is obtained in a special purpose IC from a host that is external to and communicatively connected to the special purpose IC. The process token is stored in a first memory portion of the special purpose IC. In response to receiving a processing request from the host, the processing request is processed, and data generated by processing the processing request is written in a second memory portion of the special purpose IC. When a read request is received to read the data in the second memory portion, a determination is made whether the read request includes a read token that matches the previously stored process token. If the read token matches the process token, the data in the second memory portion may be returned to the host.

20 Claims, 5 Drawing Sheets

Related U.S. Application Data continuation of application No. 16/592,520, filed on Oct. 3, 2019, now Pat. No. 11,436,160.

(51) Int. Cl.

| | |
|---|---|
| ***G06F 12/02*** | (2006.01) |
| ***G06F 12/0831*** | (2016.01) |
| ***G06F 12/14*** | (2006.01) |

(56) References Cited

U.S. PATENT DOCUMENTS

| | | | | |
|---|---|---|---|---|
| 8,823,497 | B2 * | 9/2014 | Hutzler | G07F 7/0833 235/382 |
| 8,997,198 | B1 * | 3/2015 | Kelley | G06F 21/335 726/4 |
| 9,058,507 | B2 * | 6/2015 | Tsukazaki | G06F 21/72 |
| 9,852,199 | B2 * | 12/2017 | Johnsen | G06F 16/27 |
| 11,038,866 | B2 * | 6/2021 | Kumar | H04L 63/08 |
| 2001/0013048 | A1 * | 8/2001 | Imbert de Tremiolles | G06F 9/30021 708/207 |
| 2002/0147949 | A1 * | 10/2002 | Lamb | G11C 29/12 714/733 |
| 2007/0283115 | A1 | 12/2007 | Freeman | |
| 2008/0005366 | A1 * | 1/2008 | Raatni | G06F 13/36 710/8 |
| 2010/0122108 | A1 * | 5/2010 | Suzuki | G06F 1/324 713/600 |
| 2018/0004445 | A1 * | 1/2018 | Stark | G06F 11/0727 |
| 2018/0114013 | A1 | 4/2018 | Sood et al. | |
| 2018/0304856 | A1 * | 10/2018 | Szczepaniak | H04W 12/068 |
| 2019/0272174 | A1 * | 9/2019 | Khatri | H03K 19/17728 |
| 2020/0133523 | A1 * | 4/2020 | Xia | G06F 3/0622 |
| 2021/0027291 | A1 * | 1/2021 | Ranganathan | H04L 63/0815 |
| 2021/0058251 | A1 * | 2/2021 | Varadharajan | H04L 9/0643 |
| 2025/0372134 | A1 * | 12/2025 | Cho | G11C 7/222 |

FOREIGN PATENT DOCUMENTS

| | | | | | |
|---|---|---|---|---|---|
| JP | 2004072290 | A | * | 3/2004 | G06F 21/31 |
| KR | 940020228 | A | * | 9/1994 | G06F 21/79 |

OTHER PUBLICATIONS

Communication pursuant to Article 94(3) EPC Received for European Application No. 20764557.3, mailed on Mar. 14, 2025, 06 pages.

Communication under Rule 71(3) EPC Received for European Application No. 20764557.3, mailed on Feb. 3, 2026, 07 pages.

Extended European search report received in European Application No. 26179573.6, mailed on Jun. 18, 2026, 9 pages.

Decision to grant a European patent pursuant to Article 97(1) EPC Received for EP Application No. 20764557.3, (Ms# 407224-EP01-PCT) mailed on May 29, 2026, 02 pages.

Communication pursuant to Rules 70(2) and 70a(2) EPC and reference to Rule 39(1) EPC received for European Application No. 26179573.6, (Ms# 407224-EP02-DIV) mailed on Jul. 27, 2026, 2 Pages.

* cited by examiner

PROTECTION OF DATA IN MEMORY OF AN INTEGRATED CIRCUIT USING A SECRET TOKEN

CROSS-REFERENCE TO RELATED APPLICATIONS

This application is a continuation of U.S. patent application Ser. No. 17/870,144, filed Jul. 21, 2022, entitled "Protection of Data in Memory of an Integrated Circuit Using a Secret Token," which is a continuation of U.S. patent application Ser. No. 16/592,520, filed Oct. 3, 2019, entitled "Protection of Data in Memory of an Integrated Circuit Using a Secret Token," the entireties of which are incorporated by reference herein.

BACKGROUND

Executing database queries has typically relied upon processing resources of a computing system's central processing unit (CPU). While CPUs can carry out such operations, it has become increasingly common to offload a portion of the execution to other processing devices, such as a special purpose integrated circuit (IC) that may be part of the same computing system. When offloading the portion of the execution in this manner, the data upon which operations are to be carried out is typically transferred from a memory of the computing system to a memory located within the special purpose IC.

However, memories of special purpose ICs are generally not protected from attacks. For instance, if a malicious actor or activity attempted to read the memory of a special purpose IC, the read request is usually served by the IC, which can lead to a potential break of sensitive data. In some solutions, the data stored in the memory of the special purpose IC may be encrypted to protect against such attacks. However, these types of solutions can consume processing resources that may otherwise be utilized for executing the database query, thus leading to an overall processing slowdown.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for protecting data in a memory of an integrated circuit. A process token is obtained in a special purpose IC from a host that is external to and communicatively connected to the special purpose IC. The process token is stored in a first memory portion of the special purpose IC. In response to receiving a processing request from the host, the processing request is processed, and data generated by processing the processing request is written in a second memory portion of the special purpose IC. When a read request is received to read the data in the second memory portion, a determination is made whether the read request includes a read token that matches the previously stored process token. If the read token matches the process token, the data in the second memory portion may be returned to the host.

Further features and advantages, as well as the structure and operation of various embodiments, are described in detail below with reference to the accompanying drawings. It is noted that the disclosure is not limited to the specific embodiments described herein. Such example embodiments are presented herein for illustrative purposes only. Additional example embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

Figure 1:
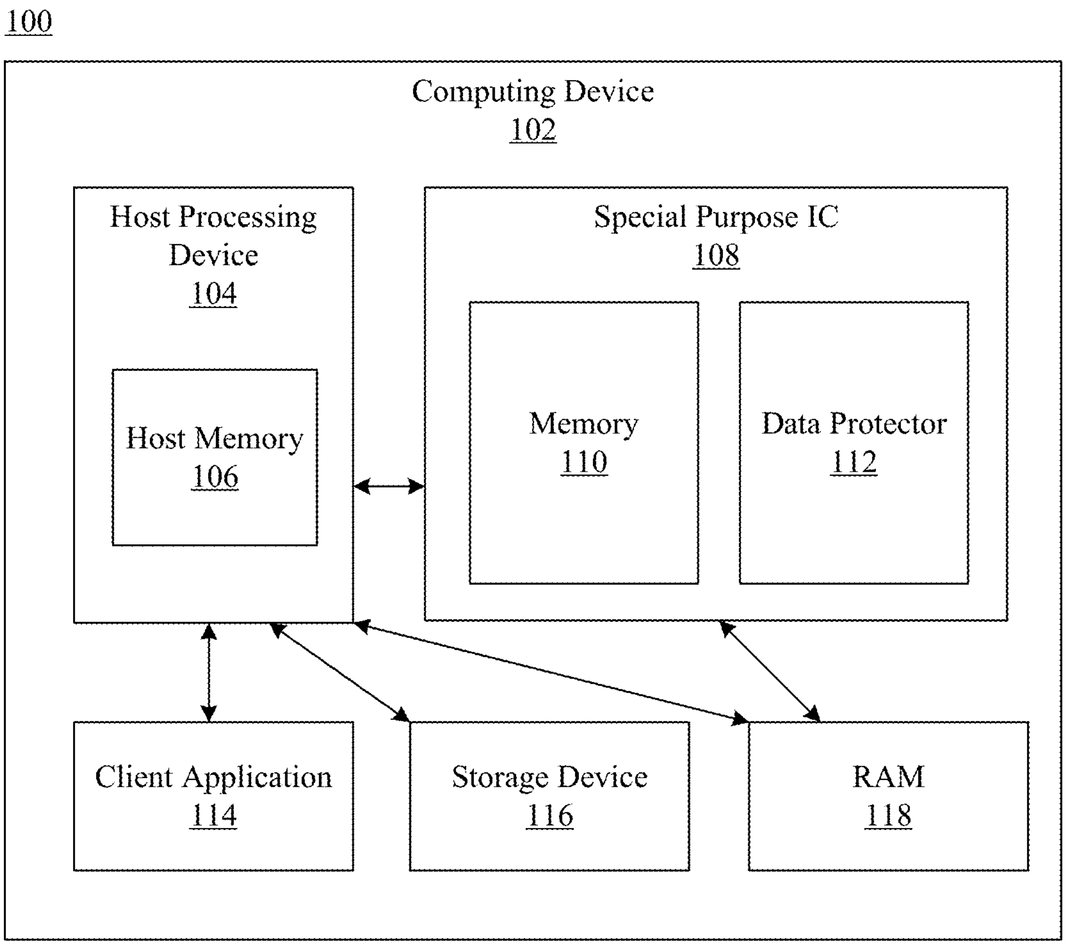
FIG. 1 shows a block diagram of a system for protecting data in a memory of a special purpose IC, according to an example embodiment.

The features and advantages will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features described herein. The scope of the disclosure is not limited to the disclosed embodiments. The disclosed embodiments merely illustrate features described herein, and modified versions of the disclosed embodiments are also encompassed by the disclosure. Example embodiments of the disclosure are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an example embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Executing database queries has typically relied upon processing resources of a computing system's CPU. While CPUs can carry out such operations, it has become increasingly common to offload a portion of the execution to other processing devices, such as a special purpose IC that may be part of the same computing system. When offloading the portion of the execution in this manner, the data upon which operations are to be carried out is typically transferred from a memory of the computing system to a memory located within the special purpose IC.

However, memories of special purpose ICs are generally not protected from attacks. For instance, if a malicious actor or activity attempted to read the memory of a special purpose IC, the read request is usually served by the IC, which can lead to a potential break of sensitive data. In some solutions, the data stored in the memory of the special purpose IC may be encrypted to protect against such attacks. However, these types of solutions can consume processing resources that may otherwise be utilized for executing the database query, thus leading to an overall processing slowdown.

In other solutions, a host process (e.g., executing on the CPU) that is in communication with the special purpose IC may provide a command to erase the memory of the special purpose IC, such as erasing the memory when the data in the memory is no longer needed, erasing the memory periodically, or erasing the data when the host process exits the special purpose IC. Erasing memory during read/write operations of the special purpose IC in such solutions, however, can cause a reduction in performance of the special purpose IC. Furthermore, even where clearing the memory is performed periodically, the periodic erasing can block or disrupt active jobs executing on the special purpose IC. Still further, if the host process crashes unexpectedly, the memory of the special purpose IC may not be erased, thus opening the possibility that a malicious process can obtain control of the special purpose IC and access the contents of its memory, which may contain sensitive information.

Embodiments described herein address these and other issues by providing techniques for protecting data in a memory of a special purpose IC, e.g., by using a randomly-generated process token. In an example system, an initialization circuit may obtain a process token from a host that is external to and communicatively connected to the special purpose IC. The process token may be stored in a first portion of the memory of the special purpose IC. A processing circuit of the special purpose IC may receive a process request from a host and write data in a second portion of the memory corresponding to the process request. In response to subsequently receiving a read request to read the data in the second portion of the memory of the special purpose IC, a data protection circuit may determine if the read request includes a read token that matches the process token. If so, the data protection circuit may return the data to the requesting process, which may be the host process or another process. If the read request does not contain a read token that matches a process token, the data is not returned.

In this manner, performance of the host computing device and the special purpose IC may be improved. For instance, while other approaches may allow a malicious process to read or scan a memory of a special purpose IC (which typically contain no data protection mechanism), potentially resulting in a compromise of sensitive data, techniques described herein allow the portion of the memory of the special purpose IC storing application data to be protected with minimal impact on performance. In other words, other than initializing the special purpose IC using a process token generated by the host, the cost of implementations described herein are relatively low, and need not require other measures during processing of data by the special purpose IC to maintain the security of the application data stored in the memory (e.g., encrypting/decrypting data for processing, receiving periodic commands from a host to clear the memory, etc., all of which can negatively impact performance of the special purpose IC). Furthermore, in some implementations, the first and/or second portions of the memory of the special purpose IC may be erased or cleared automatically during initialization, thereby eliminating the need to separately transmit commands from the host to the special purpose IC to clear the memory when a process has completed its operations. Still further, because techniques described herein provide for a relatively low-cost solution for protecting application data in the memory of a special purpose IC, the host processing device need not utilize resources to monitor whether a host process (e.g., a database application) has crashed unexpectedly, which may require transmitting a command to clear the application data from the memory of the special purpose IC. As a result, resources of both the host computing device and the special purpose IC may be more efficiently utilized, while also securely maintaining the application data in the memory of the special purpose IC.

Example embodiments are described as follows for systems and methods for protecting data in a memory of an integrated circuit using a secret token. For instance, FIG. 1 shows a block diagram of a system 100 for protecting data in a memory of a special purpose IC, according to an example embodiment. As shown in FIG. 1, system 100 includes a computing device 102. Computing device 102 includes a host processing device 104, a special purpose IC 108, a client application 114, a storage device 116, and a random-access memory (RAM) 118. As shown in FIG. 1, host processing device 104 includes a host memory 106. Special purpose IC 108 includes a memory 110 and a data protector 112. It is understood that system 100 may comprise any other components and/or subcomponents, and may be coupled to any other devices not expressly illustrated in FIG. 1. System 100 is further described as follows.

Computing device 102 may comprise any device or collection of devices (e.g., a distributed network of devices)

for receiving and/or processing requests. For instance, computing device 102 may comprise a server or number of servers, such as a network-accessible server (e.g., a cloud computing server network) that are each accessible by a network such as the Internet (e.g., in a "cloud-based" embodiment) to store, manage, and process data. Computing device may comprise any number of computing devices, and may include any type and number of other resources, including resources that facilitate communications with and between the servers, storage by the servers, etc. (e.g., network switches, storage devices, networks, etc.). In an embodiment, computing device 102 may be co-located with other devices (e.g., housed in one or more nearby buildings with associated components such as backup power supplies, redundant data communications, environmental controls, etc.) to form a datacenter, or may be arranged in other manners. Accordingly, in an embodiment, computing device 102 may be a datacenter in a distributed collection of datacenters.

In some other examples, computing device 102 may include a computing device of one or more users (e.g., individual users, family users, enterprise users, governmental users, etc.) that may comprise one or more applications, operating systems, virtual machines, storage devices, etc. that may be used to store, retrieve, and/or analyze data (e.g., database data) that may be stored locally and/or remotely. In some examples, computing device 102 may access one or more server devices to access such data. Computing device 102 may include any number of computing devices, including tens, hundreds, thousands, millions, or even greater numbers of computing devices. Computing device 102 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device 102 is not limited to a physical machine, but may include other types of machines or nodes, such as a virtual machine. Computing device 102 may interface with other devices (e.g., server devices) through one or more application programming interfaces (APIs) and/or by other mechanisms. Note that any number of program interfaces may be present.

Computing device 102 may be coupled to a network, such as any one or more of any of a local area network (LAN), a wide area network (WAN), a personal area network (PAN), a combination of communication networks, such as the Internet, and/or a virtual network. Computing device 102 may each include at least one network interface that enables communications with other devices not expressly shown in FIG. 1. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc.

In examples, computing device 102 may include one or more devices for processing Structured Query Language (SQL) queries generated via client application 114. In some implementations, client application 114 may comprise a database application that may be used to store, retrieve, and/or analyze database information that may include sensitive information through one or more database queries. This example is not intended to be limiting, and client application 114 may include any other application that may enable a user to access data that may potentially contain sensitive information. Client application 114 may be installed locally on computing device 102 or may be located on a separate computing device or node (e.g., virtual machine or the like) that is remote from computing device 102. For instance, client application 114 may comprise an end-user application, which may comprise one or more locally installed software packages, software as a service (SaaS) packages, and/or platform as a service PaaS) packages, web applications, etc. that may be used to access sensitive information. For instance, client application 114 may include software relating to data analytics, databases, business intelligence, or any other software for accessing, modifying, and/or deleting content stored in any local or remote storage device as described herein.

Sensitive information may be stored in storage device 116. For instance, storage device 116 may include any type of information that may potentially be sensitive or confidential, such as company records, personal information, educational information, health information, professional information, organizational or company information, banking or other financial records, legal documents, biographic information such as birth certificates, driver's licenses, passports, etc. These examples are illustrative only, and storage 116 may include any other type of data (including both confidential and non-confidential information) that may be stored in any structure (e.g., in a structured database, in an unstructured form, as electronic files, tables, etc.) in any one or more file systems. Storage 116 may comprise one or more local or on-premise storage devices, such as physical storage devices (e.g., hard disk drives, flash drives, solid-state drives, optical disk drives, RAM devices, etc.) and/or one or more cloud-based storages. In some examples, storage device 116 may store information in a secure manner, such as via password protection, encryption (e.g., public and private key encryption, symmetric keys, etc.), or any other secure manner as appreciated by those skilled in the relevant arts.

Host processing device 104 may comprise a processor of computing device 102 for processing requests on a host machine (e.g., computing device 102), such as requests received from client application 114. Host processing device 104 may comprise any type of processor, such as a CPU, a graphics processing unit (GPU), etc. In implementations, host processing device 104 may include any number of processors, including multiple separate processing devices, multi-core processors, etc. Host processing device 104 may also include host memory 106, which may comprise a hardware cache local to host processing device 104. For instance, host memory 106 may be configured to temporarily store data obtained from other sources (e.g., other volatile or non-volatile memory devices) for processing by host processing device 104. An example of host memory 106 includes, but it is not limited to, static RAM (SRAM) that is located on a same chip as host processing device 104. In some other implementations, host memory 106 may also comprise a virtual memory (e.g., by transferring data storage device 116 of the host computing device).

In some other examples, host processing device 104 may also be communicatively coupled to RAM 118, such as a dynamic RAM (DRAM), synchronous DRAM (SDRAM), or any other memory RAM that may be co-located on the same host machine. Host processing device 104 and RAM 118 may be communicatively coupled in any suitable manner, such as a front-side bus (FSB) or system bus with any appropriate bus width (e.g., 8 bits, 16 bits, 32 bits, etc.).

In accordance with examples described herein, host processing device 104 may be configured to offload certain operations for execution by special purpose IC 108, instead of by host processing 104. For instance, host processing device 104 may offload operations that may be more efficiently processed by special purpose IC 108, which may lead to an overall performance enhancement when processing requests (e.g., database queries).

Special purpose IC 108 may comprise any type of integrated circuit programmed and/or designed to carry out certain types of tasks or operations. For instance, special purpose IC 108 may be a Field-Programmable Gate Array (FPGA) device, an Application Specific Integrated Circuit (ASIC), or other similar device that may comprise one or more processors to execute operations (e.g., instructions, computations, etc.) that is separate from host processing device 104. In other words, special purpose IC 108 may comprise appropriate circuitry to perform processing tasks for a host process that may be executing on an external processing unit, such as host processing device 104. In some examples, special purpose IC 108 may comprise a separate physical board or component that may be installed and/or housed within computing device 102. In other examples, special purpose IC 108 may be located external to computing device 102 and be communicatively coupled to computing device 102, such as via USB, serial port, IEEE 1394, a network interface, or any other interface.

As shown in FIG. 1, special purpose IC 108 may also comprise memory 110 and data protector 112. Memory 110 may comprise a volatile or non-persistent memory co-located with special purpose IC 108 for storing data processed by special purpose IC 108. In examples, when host processing device 104 offloads operations for execution by special purpose IC 108, host processing device 104 may be configured to transfer data to be processed from host memory 106 (and/or RAM 118) to a portion of memory 110 of special purpose IC 108.

As will be described in greater detail below, data protector 112 may be configured protect data in memory 110. Among other things, data protector 112 may receive a process token generated by a host process and store the process token in a portion of memory 110 during an initialization phase. In some implementations, the portion of memory 110 that stores application data related to the host process may comprise a separate portion of memory 110 that stores the process token. Although memory 110 is illustrated in FIG. 1 as a single component, it is understood that memory 110 may also comprise a plurality of separate memory devices, such as a first memory device for storing application data, and a second memory device for storing a process token. Data protector 112 may thereafter write data to the portion of memory 110 for storing the application data (which may comprise sensitive data), such as in response to processing a request received from the host process. When an external process (e.g., the host process or any other process, such as a malicious process) attempts to read the contents of the portion of memory 110 storing the application data, data protector 112 may determine whether the read request includes a read token that matches the process token. If the read token matches the process token, data protector 112 may serve the read request. If the read request does not contain a token that matches the process token, data protector 112 may infer that a potential compromise has occurred, and take a precautionary action to protect the portion of memory 110 storing the application data (e.g., deny the read request).

It is noted and understood that implementations are not limited to the illustrative arrangement shown in FIG. 1. Rather, system 100 comprise any number of computing devices and/or servers coupled in any manner. For instance, though host processing device 104, special purpose IC 108, client application 114, storage device 116, and RAM 118 are shown as being part of computing device 102, any one or more of such components may be located remote from each other, may be implemented on a single computing device or server, or may be implemented on or distributed across one or more additional computing devices not expressly illustrated in FIG. 1.

Figure 2:
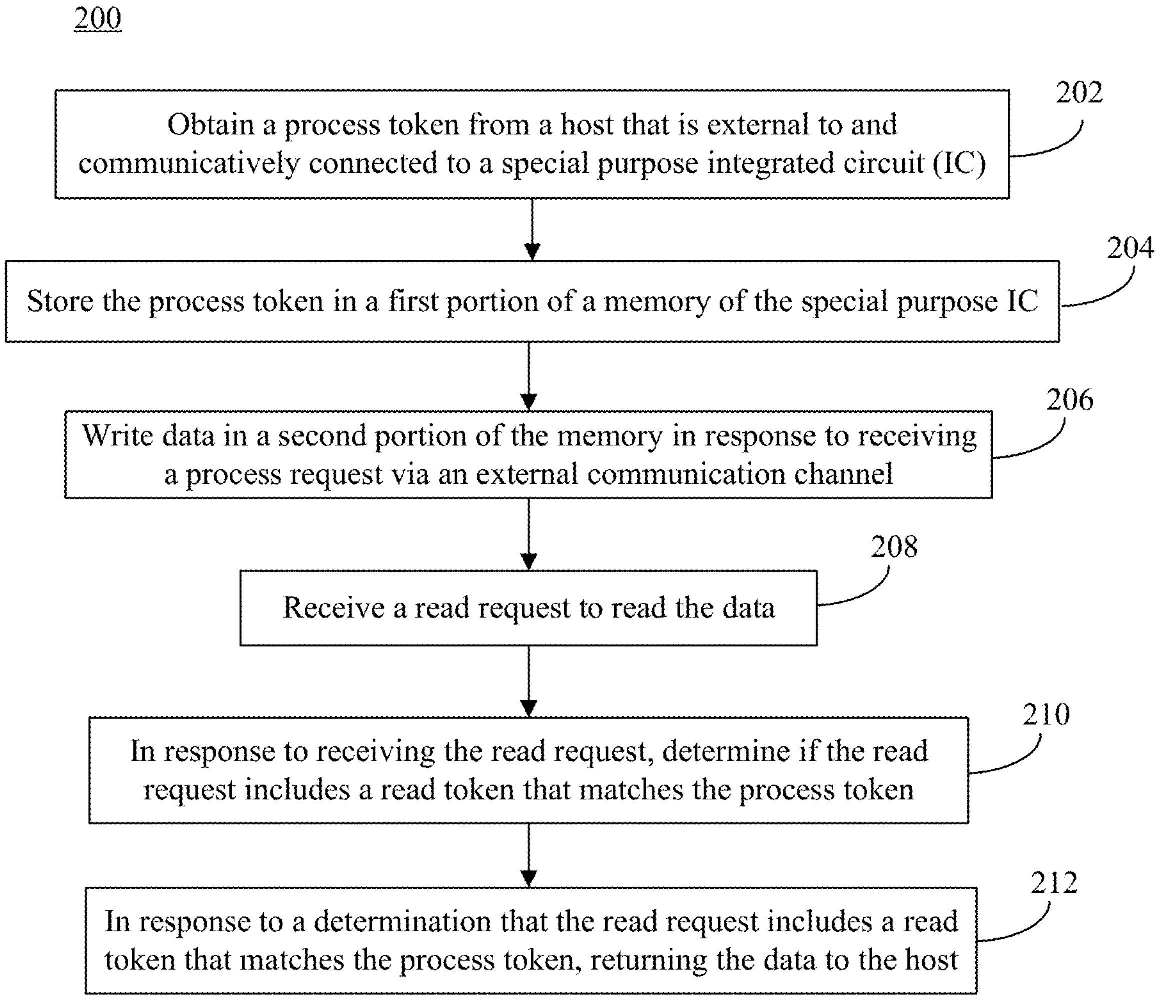
FIG. 2 shows a flowchart of a method for protecting data in a memory of a special purpose IC, according to an example embodiment.
Figure 3:
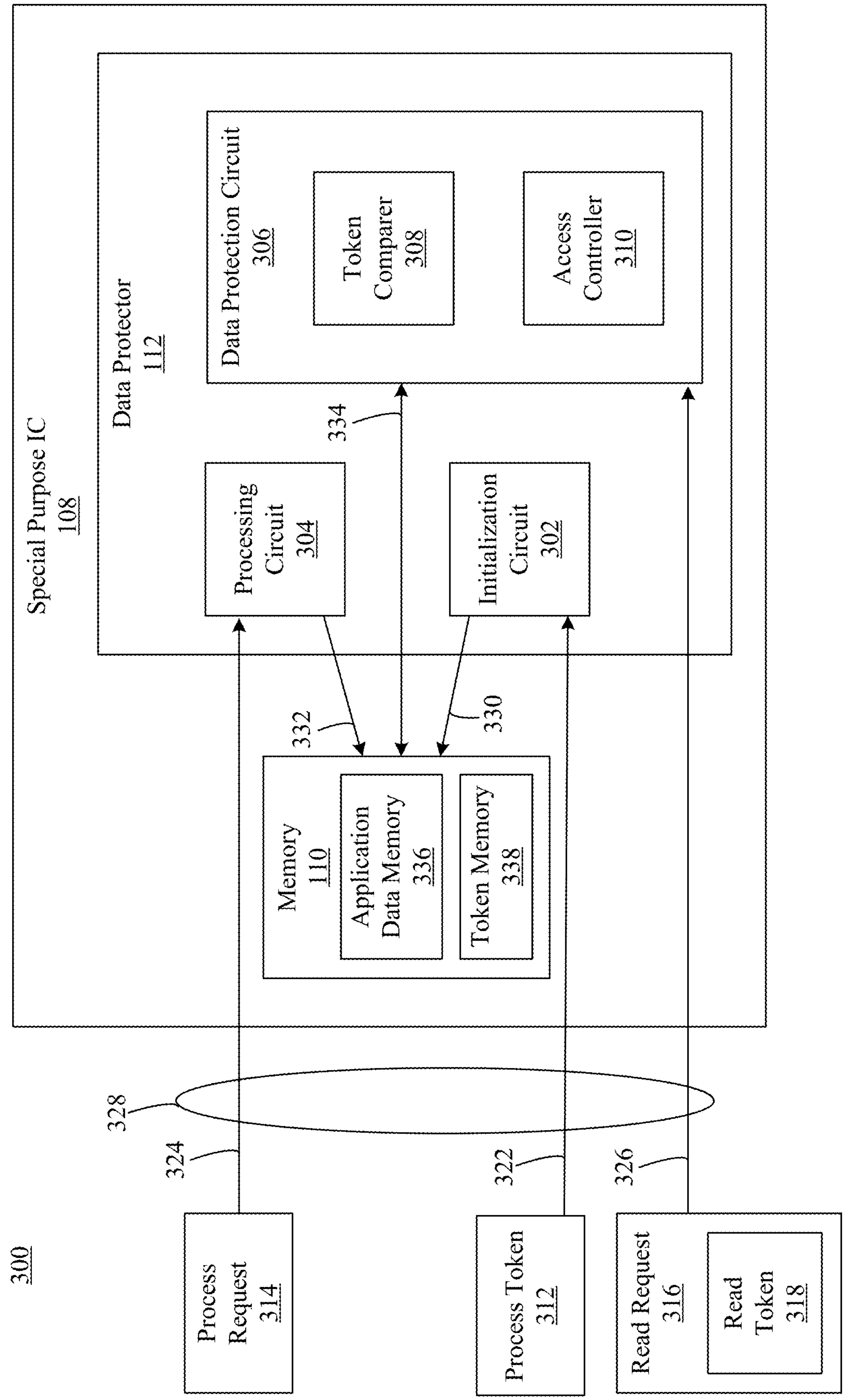
FIG. 3 shows a block diagram of an example special purpose IC that includes a data protector, according to an example embodiment.

Data protector 112 may operate in various ways to protect data in memory 110. For instance, data protector may operate according to FIG. 2. FIG. 2 shows a flowchart 200 of a method for protecting data in a memory of a special purpose IC, according to an example embodiment. For illustrative purposes, flowchart 200 and data protector 112 are described as follows with respect to FIG. 3. FIG. 3 shows a block diagram of an example special purpose IC that includes a data protector, according to an example embodiment. As shown in FIG. 3, system 300 includes an example implementation of special purpose IC 108, a process token 312, a process request 314, and a read request 316. Special purpose IC 108 may comprise, for instance, an FPGA device, ASIC device, or other similar processing device that may be programmed or designed for an intended purpose. Special purpose IC 108 includes memory 110 and data protector 112. Memory 110 includes an application data memory 336 and a token memory 338. Data protector 112 includes an initialization circuit 302, a processing circuit 304, and a data protection circuit 306. Data protection circuit 306 includes a token comparer 308 and an access controller 310. Flowchart 200 and system 300 are described in further detail as follows.

Flowchart 200 of FIG. 2 begins with step 202. In step 202, a process token is obtained from a host that is external to and communicatively connected to a special purpose IC. For instance, with reference to FIG. 3, initialization circuit 302 may be configured to receive 322 process token 312 from a host that is external to and communicatively connected to special purpose IC 108. For example, as described above, host processing device 104 may determine that one or more computations should be carried out by special purpose IC 108, rather than by host processing device 104. In such examples, prior to transferring any data to memory 110, host processing device 104 may be configured to generate process token 312 and store the process token in a memory of the host device (e.g., in host memory 106 and/or in RAM 118).

Host processing device 104 may generate process token 312 in various ways. In one example, host processing device 104 may generate process token 312 that comprises a secret that is a random sequence (e.g., a string), such as a random 16-bit, 32-bit, 64-bit, 128-bit, etc. sequence. In some other examples, process token 312 may also include a secret that comprises a random sequence of numbers and/or characters generated by host processing device 104. In other examples, process token 312 may comprise a secret that is a certain word or phrase or other combination of alphanumeric characters (e.g., selected from a repository such as a dictionary, obtained via a user input, etc.). These examples are not intended to be limiting, and those skilled in the art may appreciate that process token 312 may accordingly comprise any set of binaries generated and/or received by host processing device 104 that is expected to be unique.

Host processing device 104 may provide process token 312 to initialization circuit 302 in various ways. In implementations, host processing device 104 may provide the process token to initialization circuit 302 over a communication channel 328 that links host processing device 104 and initialization circuit 302. Communication channel 328 may include one or more channels, including but not limited to, a Peripheral Component Interconnect (PCI) bus, PCI Express (PCIe), Accelerated Graphics Port (AGB) bus, FSB, system bus, etc. that interconnect components of computing device 102, including but not limited to host processing device 104 and special purpose IC 108. In other examples, communication channel 328 may enable communication between host processing device 104 and special purpose IC 108 through mechanisms such as APIs or other calls between the components.

In one illustrative example, process token 312 may be provided to initialization circuit 302 by writing the process token to a register of special purpose IC 108 (referred to herein as a register write). For instance, special purpose IC 108 may expose one or more registers that may be written with data by external processes over communication channel 328. In such an example, host processing device 104 may provide a packet, such as a Transaction Layer Packet (TLP) or other packet that may be transmitted over communication channel 328 (e.g., a PCI packet) that identifies, among other things, the address of the intended register and the process token. In such examples, initialization circuit 302 may receive process token 312 from the register that was written by host processing device 104.

In another illustrative example, host processing device 104 may provide process token 312 using a direct memory access (DMA) technique. For instance, host processing device 104 may store process token 312 in a memory of computing device 102 (e.g., host memory 106 and/or RAM 118) and provide, to special purpose IC 108, a physical address (e.g., a pointer or the like) identifying the address of the memory where process token 312 may be obtained. Host processing device 104 may provide the physical address to special purpose IC 108 in various ways, such as by transmitting a packet (e.g., a TLP or PCI packet) using communication channel 328, using a register write, etc. In such examples, initialization circuit 302 may obtain process token by sending a message identifying the physical address (e.g., as a range of data) over communication channel 328 (e.g., a TLP or PCI packet) to initiate a DMA, upon which the range of data (including the process token) may be transferred from the host memory to initialization circuit 302.

In some implementations, upon initialization circuit 302 obtaining process token 312, the process token may be erased from the memory of the computing device. For instance, upon host processing device 104 providing process token 312 to initialization circuit 302 using a DMA technique, host processing device 104 may be configured to clear the content of host memory 106 and/or RAM 118 at the address where process token 312 was initially stored. In this manner, a malicious process with access to host computing device 104 may be prevented from accessing process token 312 that has been provided to special purpose IC 108. Host processing device 104 may be configured to automatically clearing the memory upon providing the process token in some examples. In other examples, initialization circuit 302 may be configured to provide a message over communication channel 328 host processing device 104 indicating that process token 312 has been obtained, upon which host processing device 104 may clear the memory.

It is noted and understood that the above examples are not intended to be limiting. Those skilled in the art will understand and appreciate that process token 312 may be provided from host processing device 104 to initialization circuit 302 of special purpose IC in any other way suitable manner, using any communication channel.

In step 204, the process token is stored in a first portion of a memory of the special purpose IC. For instance, with reference to FIG. 3, initialization circuit 302 may obtain process token 312 from host processing device 104 as previously described (e.g., via a register write, DMA, or any other manner) and store 330 the token in a portion of memory 110 (e.g., a non-persistent memory) of special purpose IC 108. Initialization circuit 302 may store process token 312 in a portion of memory 110 in a manner that prevents the token from being read by any external process (e.g., a process executing on host processing device 104). For instance, initialization circuit 302 may be configured to store process token 312 in token memory 338 that may be designated for storing process tokens. In example embodiments, the contents of token memory 338 may not be read or accessed by processes external to special purpose IC 108.

In some examples, token memory 338 may comprise a memory of special purpose IC 108 that may separate from application data 336 that stores application data. In other words, token memory 338 may include one or more registers (e.g., shift registers), RAM devices, block RAM devices, read-only memory (ROM) devices, etc. that may be separate from one or more of such components that may be used to store application data 336. For instance, while application data 336 may be accessed by other processes external to special purpose IC 108 (e.g., through APIs or other interfaces), token memory 338 may be implemented in special purpose IC 108 in a manner that is inaccessible by external processes. It is also noted that in some implementations, since token memory 338 may be provided to store process token 312 (rather than application data relating to a host process), token memory 338 may be sized smaller than application data memory 336.

In some other examples, such as where application data memory 336 and token memory may be part of a common memory, process token 312 may be configured to store process token 312 in a portion of the common memory (e.g., a portion that comprises token memory 338) in a protected manner. For instance, process token 312 may be protected from being accessed by other processes external to special purpose IC 108 (e.g., by storing process token in a portion of the memory inaccessible to other processes, blocking any attempt to read the portion of the memory where the process token may be stored (e.g., by checking the address of the memory space that a requesting process is attempting to read, preventing access with permission levels, etc.).

In step 206, data is written to a second portion of the memory of the special purpose IC in response to receiving a process request via an external communication channel. For instance, with reference to FIG. 3, processing circuit 304 may be configured to write 332 data to a portion of memory 110 in response to receiving 324 process request 314 from host processing device 104. In examples, processing circuit 304 may write such data to a portion of memory 110 that contains application data memory 336. As described herein, application data memory 336 may include, a portion of memory 110 (e.g., as a separate memory device or a separate portion of a shared memory device) for storing application data associated with a host process.

Process request 314 may comprise, for example, a request to process one or more operations on a set of data, such as processing a portion or all of an SQL query. In implementations, process request 314 may include, but is not limited to, the operations to be performed on a set of data, along the underlying data (which may contain sensitive information) on which operations are to be performed. In response to receiving process request 314, processing circuit 314 may be configured to store the underlying set of data on which operations are to be performed in application data memory 336. In further implementations, processing circuit 314 may also be configured to process the received process request by executing one or more computations, and write data to application data memory 336 generated by processing process request 314.

As an illustration, host processing device 104 may be executing an SQL process (e.g., a process that may receive queries, such as user-generated SQL queries via client application 114 for execution, and causes such queries to be processed). In some instances, host processing device 104 may determine that one or more operations (e.g., certain database operations, such as group aggregations or other operations) should be carried out by special purpose IC 108 for enhanced performance or for any other reason, host processing device 104 may generate process request 314 to identify the operations to be performed, and cause the underlying data on which operations are to be performed to be shifted or transferred from a memory of the host computing device (e.g., host memory 106 and/or RAM 118) to special purpose IC 108 for storage in application data memory 336. As discussed herein, processing circuit 304 may carry out one or more processing operations on the data stored in application data memory 336 (e.g., execution of a query or a portion of a query, or any other operation), and store the data generated from processing the request in application data memory 336. It is noted that implementations are not limited process request 314 comprising a request to process a query or a portion thereof, but may include processing any other type of operation where data (such as sensitive data not to be compromised, or any other data) may be transferred to application data memory 336 of special purpose IC 108 as will be appreciated by those skilled in the relevant arts. In other words, techniques described herein may be implemented for any host process that may rely on special purpose IC 108 to carry out one or more operations.

Process request 314 may be provided from host processing device 104 to special purpose IC 108 in various ways. For instance, process request 314 may be transmitted over communication channel 328, which may include one or more buses external to special purpose IC 108 that couples special purpose IC 108 to one or more components of computing device 102. For example, process request 314 (which may include underlying data on which operations are to be performed) may be provided over communication channel 328 using a register write, DMA, or any other technique described herein.

In step 208, a read request is received to read the data via the external communication channel. For instance, with reference to FIG. 3, data protection circuit 306 may be configured to receive 326 read request 316 to read the data stored in application data memory 336 via communication channel 328. Read request 316 may originate from a number of processes executing external to special purpose IC 108, such as the host process (e.g., an SQL process) executing on host processing device 104 that generated process request 314, or another process executing on host processing device 104 or other executing elsewhere (e.g., a malicious process that may have breached computing device 102).

In implementations, read request 316 may be received by data protection circuit 306 in various ways. For instance, read request 316 may be provided over any of the communication channels external to special purpose IC 108 described herein (e.g., communication channel 328, which may include one or more buses, via one or more API calls, etc.). As an example, read request 316 may request the data in application data memory 336 by identifying (e.g., in a register of special purpose IC 108) a physical address of a memory of computing device 102 (e.g., RAM 118) where data from application data memory 336 should be copied. This is only one example, and it is understood that read request 316 may include other techniques for reading (or attempting to read) data from application data memory 336.

In step 210, in response to receiving the read request, it is determined if the read request includes a read token that matches the process token. For instance, with reference to FIG. 3, token comparer 308 may be configured to obtain 334 process token 312 determine whether read request 316 includes read token 318 that matches process token 312 stored in application data memory 336. For instance, if the host process that generated process token 312 attempts to read data in application data memory 336, the host process may provide read request 316 that includes read token 318 that contains the same sequence of bits. In implementations, read token 318 may be included as part of read request 316 transmitted over communication channel 328 (e.g., via a register write or DMA), or may be transmitted separately over communication channel 328.

In other instances, such as where a different process (e.g., a malicious process or any other process that may not be authorized to access the data in application data memory 336) attempts to read the data in application data memory 336, token comparer 308 may determine that read request 316 does not contain a read token that matches process token 312. In other words, since process token 312 contains a randomly generated sequence that was generated by host processing device 104 corresponding to a certain process (e.g., an SQL process), other processes (malicious or otherwise) may not have access to the randomly generated sequence. As a result, read request 316 from such other processes may either lack a read token altogether, or may contain a sequence that does not match process token 312.

In step 212, in response to a determination that the read request includes a read token that matches the process token, the data is returned to the host. For instance, with reference to FIG. 3, access controller 310 may be configured to return the data in application data memory 336 to host processing device 104 executing a host process in response to a determination that read request 316 includes read token 318 that matches process token 312. In other words, where the read token provided with the request to read the data in application data memory 336 is the same as the process token provided during the initialization phase, access controller 310 may infer that the read request 316 originated from the process, and therefore may serve the read request in a normal manner (e.g., by transferring the data from application data memory 336 via a register write, DMA, etc.).

In this manner, the content of application data memory 336 of special purpose IC 108 may be managed in a secured manner, allowing access only where a read token is received that matches the process token provided during initialization of special purpose IC 108. Since the token is randomly generated, and stored only in a memory of the host (e.g., in host memory 106 and/or RAM 118), and in token memory 338 of special purpose IC 108, the only way for a process to obtain the token is by dumping the memory space of the host process and reading the memory dump. Because such an attempt typically requires administrative privileges that a malicious actor may not possess, the token (and therefore token memory 338) may remain protected from malicious activities.

Figure 4:
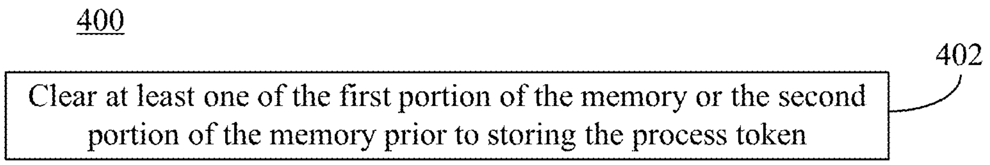
FIG. 4 shows a flowchart of a method for clearing a portion of a memory of a special purpose IC during initialization, according to an example embodiment.

As described above, memory 110 of special purpose IC 108 may be initialized in response to receiving process token 312. For example, FIG. 4 shows a flowchart of a method for clearing a portion of a memory of a special purpose IC during initialization, according to an example embodiment. In an implementation, the method of flowchart 400 may be implemented by initialization circuit 302. FIG. 4 is described with continued reference to FIG. 3. Other structural and operational implementations will be apparent to persons skilled in the relevant art(s) based on the following discussion regarding flowchart 400 and system 300 of FIG. 3.

Flowchart 400 begins with step 402. In step 402, at least one of a first portion of a memory of a special purpose IC or a second portion of the memory of the special purpose IC is cleared prior to storing the process token. For instance, as described above, initialization circuit 302 may be configured receive process token 312 in various ways and store process token 312 in token memory 338. Prior to storing process token 312, initialization circuit 302 may be configured to clear application data memory 336 and/or token memory 338 of special purpose IC 108, thereby erasing prior data that may be stored in the memory (which could be associated with the same host process or even a different host process). Initialization circuit 302 may clear application data memory 336 and/or token memory 338 in any manner as appreciated by those skilled in the art, such as setting each byte of memory to a value of “0”. Upon clearing application data memory 336 and/or token memory 338, initialization circuit 302 may subsequently store process token 312 in token memory 338 or other non-persistent memory of special purpose IC 108 in a manner as described earlier (e.g., in a protected manner such that the process token is not accessible by any external process).

Figure 5:
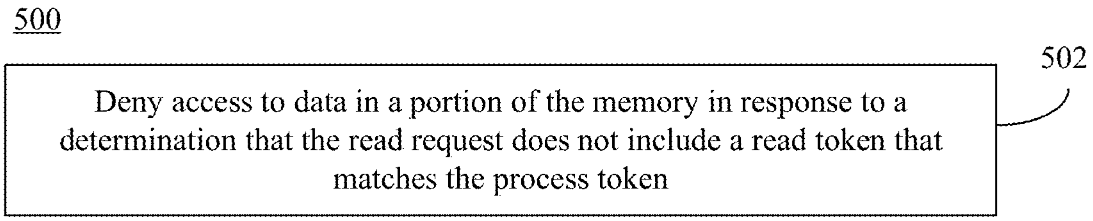
FIG. 5 shows a flowchart of a method for denying access to data in a portion of a memory of a special purpose IC, according to an example embodiment.

As described above, access controller 310 may be configured to deny access to data contained application data memory 336 from a requesting process. For example, FIG. 5 shows a flowchart of a method for denying access to data in a portion of a memory of a special purpose IC, according to an example embodiment. In an implementation, the method of flowchart 500 may be implemented by access controller 310. FIG. 5 is described with continued reference to FIG. 3. Other structural and operational implementations will be apparent to persons skilled in the relevant art(s) based on the following discussion regarding flowchart 500 and system 300 of FIG. 3.

Flowchart 500 begins with step 502. In step 502, access to the data in a second portion of a memory of a special purpose IC is denied in response to a determination that the read request does not include a read token that matches the process token. For instance, with reference to FIG. 3, access controller 310 may be configured to deny access to the data contained in application data memory 336 in response to a determination by token comparer 308 that read request 316 does not contain a read token that matches process token 312 previously received. Such an occurrence may occur for a number of reasons, such as a process attempting to read the data in application data memory 336 without providing a read token, providing a read token that contains a different sequence of bits as process token 312, or through some other malicious activity in which application data memory 336 is attempted to be accessed.

In such situations where token comparer 308 determines that read request 316 does not contain a read token that matches process token 312, access to the data in application data memory 336 may be denied by access controller 310. For instance, access controller 310 may be configured to ignore the read request, provide a response with no data, provide an indication that the read request is invalid, etc.

Denying access to the data in application data memory 336 may also comprise a variety of other precautionary actions to prevent a compromise of the data. In one implementation, access controller 310 may be configured to automatically clear the contents of application data memory 336 in response to a determination that read request 316 does not contain a read token that matches process token 312. In this manner, any attempted access where a read token does not match the process token may be inferred as a breach of one or more components of computing device 102, and application data memory 336 may be immediately cleared as a result. In other implementations, access controller 310 may be configured to carry out other precautionary measures in response to a potential breach, such as encrypting the contents of application data memory 336, alerting a user of computing device 102 or a systems administrator, disabling one or more components on computing device 102, etc.

Figure 6:
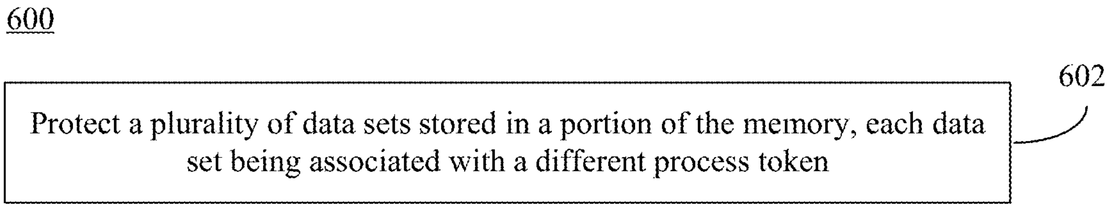
FIG. 6 shows a flowchart of a method for protecting a plurality of data sets stored in a portion of a memory of a special purpose IC, according to an example embodiment.

In some implementations, data protector 112 may be configured to protect a plurality of data sets that may be stored in application data memory 336. For example, FIG. 6 shows a flowchart of a method for protecting a plurality of data sets stored in a portion of a memory of a special purpose IC, according to an example embodiment. In an implementation, the method of flowchart 600 may be implemented by data protector 112. FIG. 6 is described with continued reference to FIG. 3. Other structural and operational implementations will be apparent to persons skilled in the relevant art(s) based on the following discussion regarding flowchart 600 and system 300 of FIG. 3.

Flowchart 600 begins with step 602. In step 602, a plurality of data sets stored in a portion of a memory of a special purpose IC are protected, each data set being associated with a different process token. For instance, with reference to FIG. 3, special purpose IC 108 may be configured to perform a plurality of operations for one or more host processes executing on host processing device 104. In such examples, process token 312 may be obtained for each process, either from the same host or even a different host that are external to and communicatively connected to special purpose IC 108 via communication channel 328, enabling each a plurality of data sets to be protected based on a respective process token in accordance with techniques described herein.

In one illustrative example, application data memory 336 may be broken down into smaller portions or containers (e.g., predetermined portions, such as 4 kilobyte or larger blocks or pages, or broken down dynamically based on process requests received from host processes). In such an example, each portion of application data memory 336 may be associated with a different process token that may be received from the same host process or even different host processes in accordance with techniques described herein. In some implementations, such as where the application data memory 336 is broken down into predetermined sizes for instance, it is noted that a set of data originating from the same host process need not be associated with different process tokens, but instead may be associated with the same process token.

In other examples, such as where multiple different host processes may share processing resources of special purpose IC 108, each process may be allocated a portion of application data memory 336 for storing application data associated with the respective host process. In such examples, each host process sharing resources of special purpose IC 108 may provide a separate randomly-generated token associated with its respective set of data to be stored in token memory 338 (e.g., based on how application data memory 336 may be broken down, including but not limited to allocating the memory space based on predetermined sizes, the identity of the host processes sharing resources of special purpose IC 108, etc.). When a read request is received to read any set of data contained in application data memory 336, data protection circuit 306 may be configured to determine which, if any, process token matches the received read token and return (or not return) the corresponding set of data (e.g., the subset of application data memory 336 allocated to the host process) to the requesting process accordingly.

In this manner, application data memory 336 (and therefore processing resources of special purpose IC 108) may be shared by a plurality of different processes in a manner that ensures the security of the data set corresponding to each process. As a result, application data stored in application data memory 336 need not be protected using only a single process token, but instead may be protected with enhanced granularity (e.g., based on predetermined size allocations of the memory space, based on the host process, etc.).

III. Example Mobile and Stationary Device Embodiments

Computing device 102, host processing device 104, special purpose IC 108, memory 110, data protector 112, initialization circuit 302, processing circuit 304, data protection circuit 306, token comparer 308, access controller 310, process token 312, process request 314, read request 316, read token 318, application data memory 336, token memory 338, flowchart 200, flowchart 400, flowchart 500, and/or flowchart 600 may be implemented in hardware or be implemented as hardware logic/electrical circuitry (e.g., electrical circuits comprised of transistors, logic gates, operational amplifiers, one or more application specific integrated circuits (ASICs), one or more field programmable gate arrays (FPGAs)). For example, one or more of computing device 102, host processing device 104, special purpose IC 108, memory 110, data protector 112, initialization circuit 302, processing circuit 304, data protection circuit 306, token comparer 308, access controller 310, process token 312, process request 314, read request 316, read token 318, application data memory 336, token memory 338, flowchart 200, flowchart 400, flowchart 500, and/or flowchart 600 may be implemented separately or together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received instructions and/or include embedded firmware to perform functions. Further, client application 114 may be implemented in hardware combined with software and/or firmware, such as being implemented as computer code/instructions stored in a physical/hardware-based computer readable storage medium and configured to be executed in one or more processors.

Figure 7:
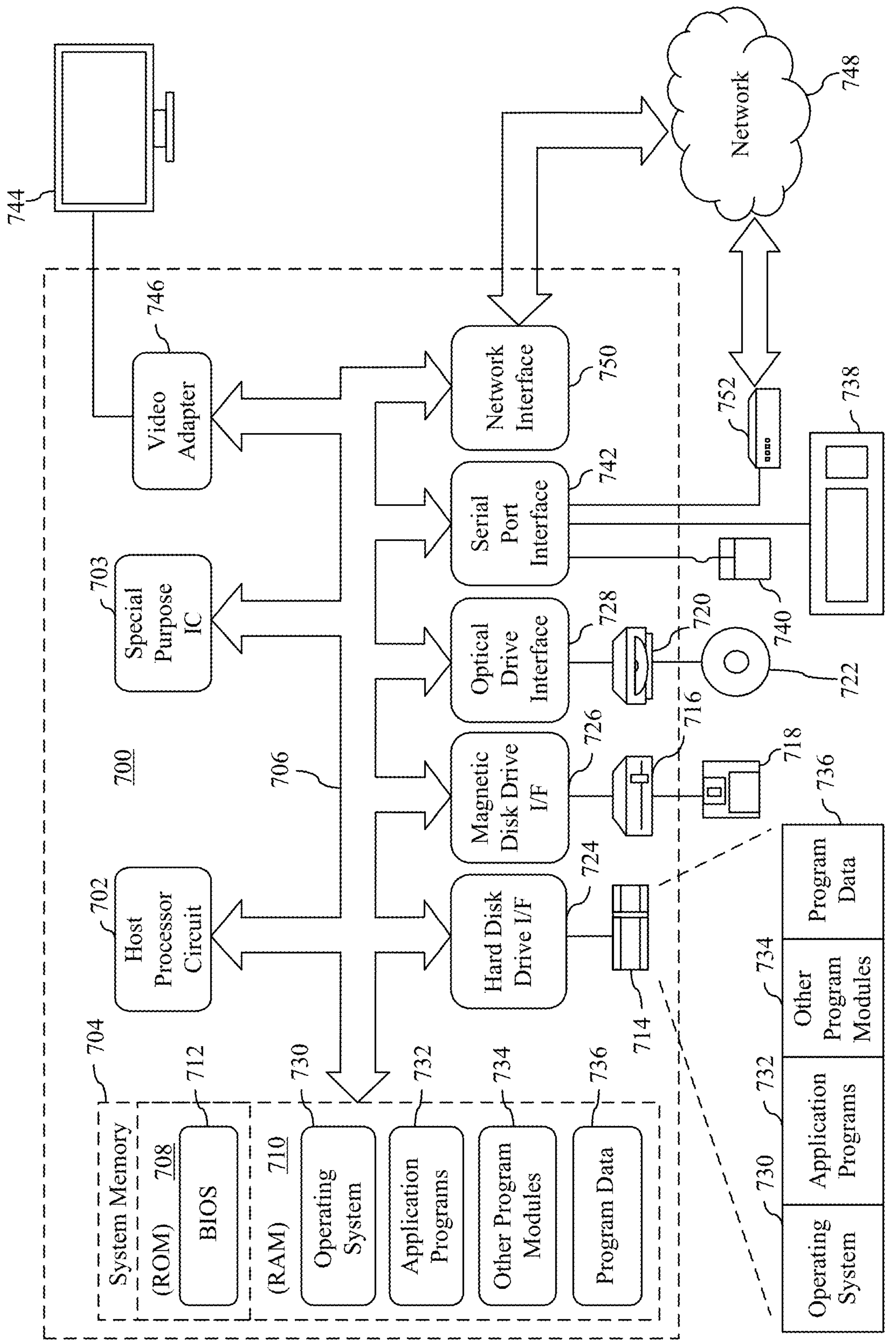
FIG. 7 shows a block diagram of an example computing device that may be used to implement example embodiments.

FIG. 7 depicts an exemplary implementation of a computing device 700 in which example embodiments may be implemented. For example, any of computing device 102, host processing device 104, special purpose IC 108, memory 110, data protector 112, initialization circuit 302, processing circuit 304, data protection circuit 306, token comparer 308, access controller 310, process token 312, process request 314, read request 316, read token 318, application data memory 336, and/or token memory 338 may be implemented in one or more components of computing device 700 in stationary or mobile computer embodiments. The description of computing device 700 provided herein is provided for purposes of illustration, and is not intended to be limiting. Example embodiments may be implemented in further types of computer systems, as would be known to persons skilled in the relevant art(s).

As shown in FIG. 7, computing device 700 includes one or more processors, referred to as host processor circuit 702, a special purpose IC 703, a system memory 704, and a bus 706 that couples various system components including system memory 704, host processor circuit 702, and/or special purpose IC 703. Host processor circuit 702 and/or special purpose IC 703 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. In examples, any suitable actions performed by host processing device 104 in connection with one or more steps of flowchart 200, 400, 500, and/or 600 may be performed by host processor circuit 702. Host processor circuit 702 may execute program code stored in a computer readable medium, such as program code of operating system 730, application programs 732, other programs 734, etc.

Special purpose IC 703 may be an example of special purpose IC 108 described herein. For instance, any one or more of memory 110, initialization circuit 302, processing circuit 304, data protection circuit 306, token comparer 308, access controller 310, application data memory 336, and/or token memory 338 may be implemented in special purpose IC 703. Furthermore, any suitable step(s) of flowchart 200, 400, 500, and/or 600 performed by special purpose IC 108 described herein may be performed by special purpose IC 703 (e.g., in hardware). Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMS, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing client application 114, and/or further example components described herein.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to host processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of example embodiments described herein. Accordingly, such computer programs represent controllers of the computing device 700.

Computing device 700 may also include computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

A system is disclosed herein. The system includes: an FPGA comprising: a first FPGA memory portion; a second FPGA memory portion; an initialization circuit configured to obtain a process token from a host that is external to and communicatively connected to the FPGA, and store the process token in the first FPGA memory portion; a processing circuit configured to, in response to receiving a process request via an external communication channel to which the FPGA is connected: process the processing request, and write data generated by processing the processing request in the second FPGA memory portion; and a data protection circuit configured to: in response to receiving a read request to read the data via the external communication channel, determine if the read request includes a read token that matches the process token, and in response to determining that the read requests includes a read token that matches the process token, return the data to the host.

In one implementation of the foregoing system, the system further includes: a host processing device, the host processing device being configured to provide the process token and the processing request to the FPGA.

In another implementation of the foregoing system, the initialization circuit is configured to clear at least one of the first FPGA memory portion or the second FPGA memory portion prior to storing the process token.

In another implementation of the foregoing system, the data protection circuit is configured to deny access to the data in the second FPGA memory portion in response to determining that the read request does not include a read token that matches the process token.

In another implementation of the foregoing system, the denying access to the data in the second FPGA memory portion comprises clearing the second FPGA memory portion.

In another implementation of the foregoing system, the process token comprises a random sequence of bits generated by the host.

In another implementation of the foregoing system, wherein the FPGA further comprises: a first memory device that includes the first FPGA memory portion; and a second memory device that includes the second FPGA memory portion.

In another implementation of the foregoing system, the data protection circuit is further configured to protect a plurality of data sets stored in the second FPGA memory portion, each data set being associated with a different process token obtained from one or more hosts that is external to and communicatively connected to the FPGA.

A system is disclosed herein. The system includes an ASIC comprising: a first ASIC memory portion; a second ASIC memory portion; an initialization circuit configured to obtain a process token from a host that is external to and communicatively connected to the ASIC, and store the process token in the first ASIC memory portion; a processing circuit configured to, in response to receiving a process request via an external communication channel to which the ASIC is connected: process the processing request, and write data generated by processing the processing request in the second ASIC memory portion; and a data protection circuit configured to: in response to receiving a read request to read the data via the external communication channel, determine if the read request includes a read token that matches the process token, and in response to determining that the read request includes a read token that matches the process token, return the data to the host.

In one implementation of the foregoing system, the system further includes: a host processing device, the host processing device being configured to provide the process token and the processing request to the ASIC.

In another implementation of the foregoing system, the initialization circuit is configured to clear at least one of the first ASIC memory portion or the second ASIC memory portion prior to storing the process token.

In another implementation of the foregoing system, the data protection circuit is configured to deny access to the data in the second ASIC memory portion in response to determining that the read request does not include a read token that matches the process token.

In another implementation of the foregoing system, the denying access to the data in the second ASIC memory portion comprises clearing the second ASIC memory portion.

In another implementation of the foregoing system, the process token comprises a random sequence of bits generated by the host.

In another implementation of the foregoing system, the initialization circuit is configured to obtain the process token via one of a register write or a direct memory access.

In another implementation of the foregoing system, the data protection circuit is further configured to protect a plurality of data sets stored in the second ASIC memory portion, each data set being associated with a different process token obtained from one or more hosts that is external to and communicatively connected to the ASIC.

A method is disclosed herein. The method includes: obtaining, in a special purpose integrated circuit (IC) that comprises one of a field-programmable gate array (FPGA) or an application-specific integrated circuit (ASIC), a process token from a host that is external to and communicatively connected to the special purpose IC; storing the process token in a first memory portion of the special purpose IC; in response to receiving a process request via an external communication channel to which the special purpose IC is connected, writing data in a second memory portion of the special purpose IC; receiving a read request to read the data via the external communication channel; in response to receiving the read request, determining if the read request includes a read token that matches the process token; and in response to determining that the read request includes a read token that matches the process token, returning the data to the host.

In one implementation of the foregoing method, the data protection circuit is configured to deny access to the data in the second memory portion in response to determining that the read request does not include a read token that matches the process token.

In another implementation of the foregoing method, the obtaining the process token comprises obtaining the process token via one of a register write or a direct memory access.

In another implementation of the foregoing method, the method further includes: protecting a plurality of data sets stored in the second memory portion, each data set being associated with a different process token obtained from one or more hosts that is external to and communicatively connected to the special purpose IC.

V. Conclusion

While various embodiments of the disclosure have been described above, it should be understood that they have been presented by way of example only, and not limitation. It will be understood by those skilled in the relevant art(s) that various changes in form and details may be made therein without departing from the spirit and scope of the disclosure as defined in the appended claims. Accordingly, the breadth and scope of the disclosure should not be limited by any of the above-described exemplary embodiments, but should be defined only in accordance with the following claims and their equivalents.

What is claimed is:

1. A system, comprising:
- an integrated circuit (IC) comprising:
  - a first IC memory portion;
  - a second IC memory portion;
- an initialization circuit configured to obtain a first set of bits, and store the first set of bits in the first IC memory portion;
- a processing circuit configured to store data corresponding to a process request in the second IC memory portion; and
- a data protection circuit configured to:
  - receive a request to access the second IC memory portion comprising the data,
  - in response to receiving the request, obtain the first set of bits stored in the first IC memory portion during initialization of the IC;
  - determine whether a second set of bits is received matching the first set of bits; and
  - in response to determining that the second set of bits is not received, deny access to the data, wherein the first set of bits stored during initialization in the first IC memory portion is used to determine whether to grant access to the second IC memory portion.

2. The system of claim 1, wherein the initialization circuit is configured to obtain the first set of bits via one of a register write or a direct memory access.

3. The system of claim 1, wherein the initialization circuit is configured to clear at least one of the first IC memory portion or the second IC memory portion prior to storing the first set of bits.

4. The system of claim 1, wherein the data protection circuit is further configured to:
- receive a second request to access the second IC memory portion comprising the data;
- determine that a third set of bits included in the second request matches the first set of bits; and in response to determining that the third set of bits matches the first set of bits, grant access to the second IC memory portion.

5. The system of claim 1, wherein the data protection circuit is configured to clear the second IC memory portion in response to determining that the second set of bits matching the first set of bits is not received.

6. The system of claim 1, wherein the data protection circuit is configured to encrypt the data in the second IC memory portion in response to determining that the second set of bits matching the first set of bits is not received.

7. The system of claim 1, wherein the first set of bits comprises a sequence of bits generated by a host from which the first set of bits is received.

8. The system of claim 1, wherein the IC comprises one of a field-programmable gate array (FPGA) or an application-specific integrated circuit (ASIC).

9. A method, comprising:

obtaining, in an integrated circuit (IC), a first set of bits;

storing the first set of bits in a first memory portion of the IC;

storing data corresponding to a process request in a second memory portion of the IC;

receiving a request to access the second memory portion of the IC comprising the data;

in response to receiving the request, obtain the first set of bits stored in the first memory portion of the IC during initialization of the IC;

determining whether a second set of bits is received matching the first set of bits;

in response to determining that the second set of bits is not received, deny access to the data, wherein the first set of bits stored during initialization in the first memory portion of the IC is used to determine whether to grant access to the second IC memory portion.

10. The method of claim 9, further comprising:

clearing at least one of the first memory portion of the IC or the second memory portion of the IC prior to storing the first set of bits.

11. The method of claim 9, further comprising:

receiving a second request to access the second IC memory portion comprising the data;

determining that a third set of bits included in the second request matches the first set of bits; and in response to determining that the third set of bits matches the first set of bits, granting access to the second IC memory portion.

12. The method of claim 9, further comprising:

clearing the second memory portion of the IC in response to the determining that the second set of bits matching the first set of bits is not received.

13. The method of claim 9, further comprising:

encrypting the data in the second memory portion of the IC in response to determining that the second set of bits matching the first set of bits is not received.

14. The method of claim 9, wherein the first set of bits comprises a sequence of bits generated by a host from which the first set of bits is received.

15. The method of claim 9, wherein the IC comprises one of a field-programmable gate array (FPGA) or an application-specific integrated circuit (ASIC).

16. A computer-readable storage medium having computer program code recorded thereon that when executed by at least one processor causes the at least one processor to perform a method comprising:

obtaining, in an integrated circuit (IC), a first set of bits;

storing the first set of bits in a first memory portion of the IC during initialization of the IC;

storing data corresponding to a process request in a second memory portion of the IC;

receiving a request to access the second memory portion of the IC comprising the data;

in response to receiving the request, obtaining the first set of bits stored in the first IC memory portion;

determining whether a second set of bits is received matching the first set of bits; and in response to determining that the second set of bits is not received, deny access to the data, wherein the first set of bits stored during initialization in the first memory portion of the IC is used to determine whether to grant access to the second memory portion of the IC.

17. The computer-readable storage medium of claim 16, wherein the method further comprises:

clearing at least one of the first memory portion of the IC or the second memory portion of the IC prior to storing the first set of bits.

18. The computer-readable storage medium of claim 16, wherein the method further comprises:

receiving a second request to access the second IC memory portion comprising the data;

determining that a third set of bits included in the second request matches the first set of bits; and in response to determining that the third set of bits matches the first set of bits, granting access to the second IC memory portion.

19. The computer-readable storage medium of claim 16, wherein the method further comprises:

clearing the second memory portion of the IC in response to the determining that the second set of bits matching the first set of bits is not received.

20. The computer-readable storage medium of claim 16, wherein the first set of bits comprises a sequence of bits generated by a host from which the first set of bits is received.

* * * * *